US012679349B2

(12) United States Patent
Tanaka

(10) Patent No.: US 12,679,349 B2
(45) Date of Patent: Jul. 14, 2026

(54) COLLISION PREVENTION APPARATUS

(71) Applicant: TOYOTA JIDOSHA KABUSHIKI KAISHA, Toyota (JP)

(72) Inventor: Tomohiro Tanaka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/769,626

(22) Filed: Jul. 11, 2024

(65) Prior Publication Data

US 2025/0136098 A1      May 1, 2025

(30) Foreign Application Priority Data

Oct. 30, 2023    (JP) ................................. 2023-185151

(51) Int. Cl.
    *B60W 30/09*          (2012.01)
    *B60W 30/095*         (2012.01)
(52) U.S. Cl.
    CPC ........ *B60W 30/09* (2013.01); *B60W 30/0956* (2013.01); *B60W 2554/802* (2020.02); *B60W 2720/106* (2013.01)
(58) Field of Classification Search
    CPC ............. B60W 30/09; B60W 30/0956; B60W 2554/802; B60W 2720/106
    See application file for complete search history.

(56) References Cited

U.S. PATENT DOCUMENTS

| | | | |
|---|---|---|---|
| 9,969,261 | B2 | 5/2018 | Kodama |
| 10,045,173 | B1 | 8/2018 | Morimura et al. |
| 10,106,157 | B2 | 10/2018 | Sawada et al. |
| 10,150,407 | B2 | 12/2018 | Takahashi et al. |
| 10,696,297 | B2 | 6/2020 | Nguyen Van et al. |
| 11,001,255 | B2 | 5/2021 | Fukuman et al. |
| 11,110,937 | B2 | 9/2021 | Kinoshita et al. |
| 2019/0001968 | A1 | 1/2019 | Yorifuji et al. |
| 2019/0135282 | A1 | 5/2019 | Sakaguchi |
| 2019/0344828 | A1 | 11/2019 | Omori et al. |
| 2019/0389488 | A1 | 12/2019 | Yamada et al. |
| 2020/0001839 | A1* | 1/2020 | Lee ..................... B60T 8/17558 |
| 2020/0055495 | A1* | 2/2020 | Takaki ...................... B60T 8/17 |

(Continued)

FOREIGN PATENT DOCUMENTS

| | | |
|---|---|---|
| JP | H11-039597 A | 2/1999 |
| JP | 2019-084924 A | 6/2019 |
| JP | 2023-153681 A | 10/2023 |

*Primary Examiner* — Toya Pettiegrew

(74) *Attorney, Agent, or Firm* — SoraIP, Inc.

(57)          ABSTRACT

A collision prevention apparatus includes a driving assistance ECU configured to determine a risk of an own vehicle colliding with an obstacle when it is determined that the obstacle is present ahead of the own vehicle based on information acquired by an object target information acquisition apparatus that acquires information of an object target around the own vehicle, and to execute countermeasure control that reduces the risk when it is determined that the risk is present. The driving assistance ECU executes at least one of changing a condition for the determination of the risk such that it is more easily determined that the risk is present or causing an effect of the countermeasure control to be higher when it is determined that the obstacle is a leading vehicle that temporarily stops and the leading vehicle has started moving.

18 Claims, 5 Drawing Sheets

(56) References Cited

U.S. PATENT DOCUMENTS

| 2020/0148229 | A1* | 5/2020 | Meyer | B60T 7/12 |
| 2021/0101589 | A1* | 4/2021 | Jeon | G05D 1/0061 |
| 2023/0311874 | A1 | 10/2023 | Kondo | |

* cited by examiner

COLLISION PREVENTION APPARATUS

CROSS-REFERENCE TO RELATED APPLICATION

This application claims priority to Japanese Patent Application No. 2023-185151 filed on Oct. 30, 2023, incorporated herein by reference in its entirety.

BACKGROUND

1. Technical Field

The present disclosure relates to a collision prevention apparatus that reduces a risk of an own vehicle colliding with an obstacle.

2. Description of Related Art

As one collision prevention apparatus for a vehicle such as an automobile, a collision prevention apparatus has been known that determines a risk of the vehicle colliding with an obstacle when the obstacle is detected ahead of the vehicle and executes countermeasure control such as autonomous deceleration that reduces the risk when it is determined that the risk is present.

For example, in Japanese Unexamined Patent Application Publication No. 11-039597 (JP 11-039597 A) described below, a collision prevention apparatus that detects a leading vehicle existing ahead of an own vehicle on the basis of an image photographed by an in-vehicle camera, determines a possibility of a collision between the own vehicle and a leading vehicle, and informs a driver by displaying a determination result thereof on a display is described.

According to the collision prevention apparatus, even when an obstacle is present ahead of the vehicle and there is a risk of the vehicle colliding with the obstacle, the risk of the vehicle colliding with the obstacle can be reduced because countermeasure control such as autonomous deceleration and notification of a possibility of the collision is performed.

SUMMARY

For example, when an own vehicle travels so as to follow a leading vehicle, the following occurs. When a traffic light turns red and the leading vehicle and the own vehicle temporarily stop in front of the traffic light and then the traffic light turns green and the leading vehicle starts moving, the own vehicle also starts moving thereafter. However, when the leading vehicle rapidly decelerates or stops immediately after starting to move due to a traffic jam of vehicles ahead of the leading vehicle or the like, the distance between the own vehicle and the leading vehicle rapidly decreases, and hence the risk of the own vehicle colliding with the back of the leading vehicle becomes higher.

In the related-art collision prevention apparatus such as the collision prevention apparatus described in JP 11-039597 A, a situation in which the distance between the own vehicle and the leading vehicle rapidly decreases is not considered, and hence it is difficult to reduce the risk of the own vehicle colliding with the leading vehicle in such a situation.

The present disclosure provides a collision prevention apparatus improved to have a higher probability of being able to reduce a risk of an own vehicle colliding with a leading vehicle in a situation in which the distance between the own vehicle and the leading vehicle rapidly decreases as compared to the related art.

According to the present disclosure, a collision prevention apparatus (100) is provided which includes: an object target information acquisition apparatus (17) that acquires information of an object target around an own vehicle (102); and a control unit (driving assistance ECU 10) configured to determine a risk of the own vehicle colliding with an obstacle (S80, S100) when it is determined that the obstacle is present ahead of the own vehicle based on the information acquired by the object target information acquisition apparatus (S20), and to execute countermeasure control that reduces the risk (S90, S110) when it is determined that the risk is present.

The control unit (driving assistance ECU 10) is configured to execute at least one of changing a condition for the determination of the risk such that it is more easily determined that the risk is present or causing an effect of the countermeasure control to be higher (S70) when it is determined that the obstacle is a leading vehicle (114) that temporarily stops (S230) and the leading vehicle has started moving (S250).

According to the configuration described above, at least one of changing a condition for the determination of the risk such that it is more easily determined that the risk is present or causing the effect of the countermeasure control to be higher is executed when it is determined that the obstacle is a leading vehicle that temporarily stops and the leading vehicle has started moving.

When the condition for the determination of the risk is changed, it is more easily determined that the risk is present, and hence the countermeasure control is started earlier. Therefore, the risk of the vehicle colliding with the back of the leading vehicle can be effectively reduced as compared to a case in which the condition for the determination of the risk is not changed. The countermeasure control is effectively executed when the effect of the countermeasure control is caused to be higher. Therefore, the risk of the vehicle colliding with the back of the leading vehicle can be effectively reduced as compared to a case in which the effect of the countermeasure control is not caused to be higher.

In one aspect of the present disclosure, the control unit (driving assistance ECU 10) may be configured to obtain a distance (Lr) between the own vehicle and the leading vehicle (114) based on the information acquired by the object target information acquisition apparatus (17) (S40) and determine that the risk is present (S80, S100) when the distance is equal to or less than a reference distance (Lrc1, Lrc2), and the control unit is further configured to change the condition for the determination of the risk by correcting the reference distance to be increased (S70) when it is determined that the leading vehicle has started moving (S250).

According to the aspect described above, when it is determined that the leading vehicle has started moving, the reference distance is corrected to be increased, and it is more easily determined that the distance between the own vehicle and the leading vehicle is equal to or less than the reference distance. Therefore, the condition for the determination of the risk can be changed such that it is more easily determined that the risk of a collision is present.

In another aspect of the present disclosure, the countermeasure control may include autonomous deceleration (S110) that autonomously decelerates the own vehicle, and the control unit (driving assistance ECU 10) may be configured to cause an effect of the countermeasure control to be higher by correcting a deceleration degree of the autonomous deceleration to be increased (S70) when it is determined that the leading vehicle has started moving (S250).

According to the aspect described above, when it is determined that the leading vehicle has started moving, the deceleration degree of the autonomous deceleration is corrected to be increased, and the deceleration of the own vehicle is effectively executed. Therefore, the effect of the countermeasure control that reduces the risk of a collision can be caused to be higher.

In another aspect of the present disclosure, the control unit (driving assistance ECU 10) may be configured to end the at least one execution (S300) when an amount of time elapsed from a time point at which it is determined that the risk is present is equal to or more than an amount of reference time (Tc).

According to the aspect described above, when the amount of time elapsed from the time point at which it is determined that the risk is present is equal to or more than the amount of reference time, the at least one execution ends. Therefore, a risk of the at least one execution excessively continuing can be reduced.

In another aspect of the present disclosure, the control unit (driving assistance ECU 10) may be configured to end the at least one execution (S300) when a traveling distance of the own vehicle from a time point at which it is determined that the risk is present is equal to or more than a reference traveling distance (Lvc).

According to the aspect described above, when the traveling distance of the own vehicle from the time point at which it is determined that the risk is present is equal to or more than the reference traveling distance, the at least one execution ends. Therefore, a risk of the at least one execution excessively continuing can be reduced.

In the description above, other objects, other features, and associated advantages of the present disclosure may be easily understood from the description of the embodiment of the present disclosure described with reference to the drawings below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 6 is a view showing a situation in which the leading vehicle has started moving and the own vehicle has started moving immediately thereafter, but the leading vehicle has rapidly decelerated or stopped immediately after starting to move due to a traffic jam of vehicles ahead of the leading vehicle and the like.

DETAILED DESCRIPTION OF EMBODIMENTS

A collision prevention apparatus according to an embodiment of the present disclosure is described in detail with reference to the accompanying drawings below.

Figure 1:
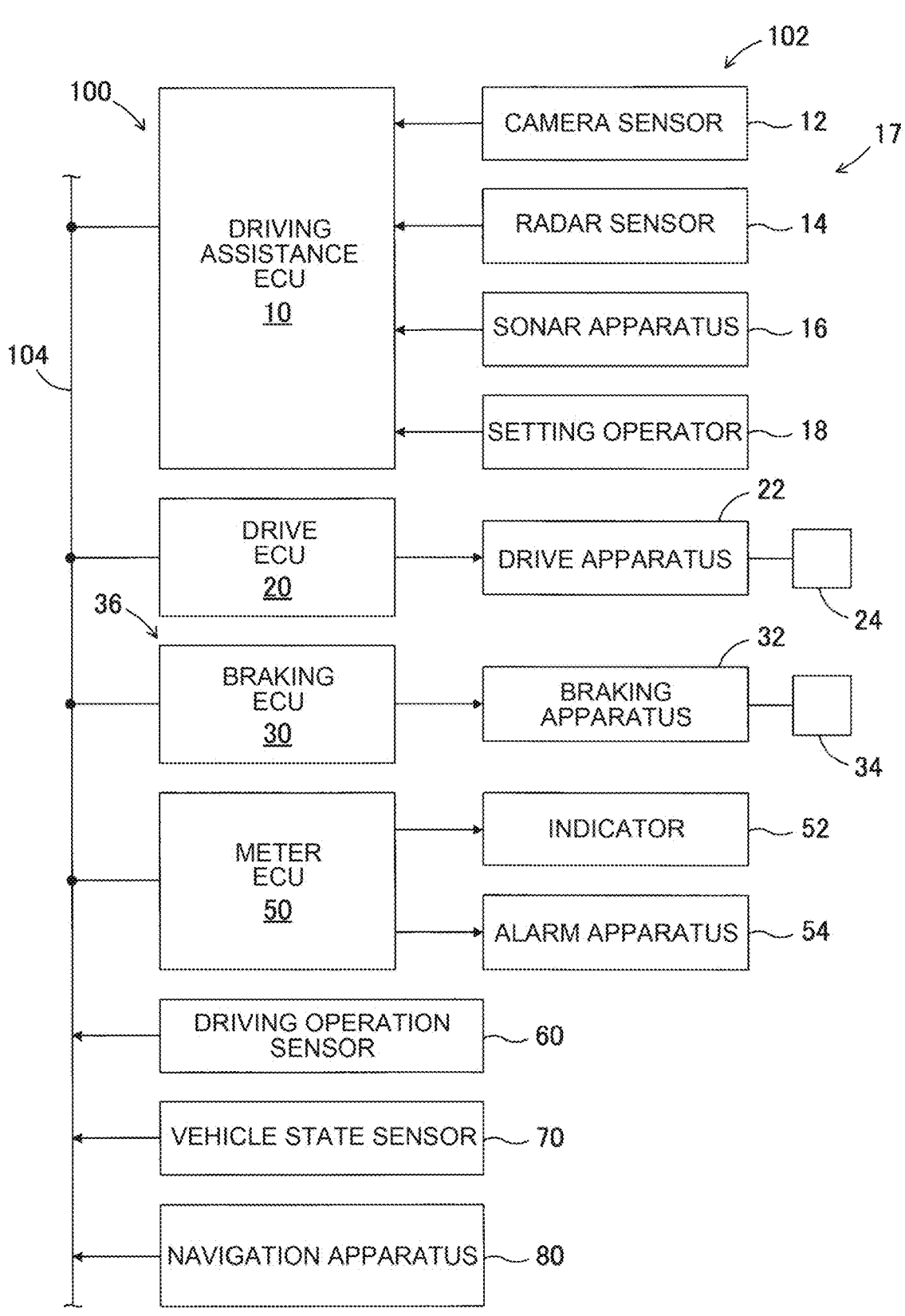
FIG. 1 is a schematic configuration diagram showing a collision prevention apparatus according to an embodiment.

As shown in FIG. 1, a collision prevention apparatus 100 according to the embodiment of the present disclosure is applied to a vehicle 102 and includes a driving assistance ECU 10. The vehicle 102 is a vehicle capable of performing autonomous driving and includes a drive ECU 20, a braking ECU 30, and a meter ECU 50. The term ECU means an electronic control unit (ECU) including a microcomputer as a main part. The vehicle 102 is expressed as the own vehicle 102 as needed.

The microcomputer of each ECU includes a CPU, a ROM, a RAM, a readable-writable non-volatile memory (N/M), an interface (I/F), and the like. The CPU realizes various functions by executing an instruction (a program, a routine) stored in the ROM. Those ECUs are connected to each other in a manner in which data is exchangeable (communicable manner) via a controller area network (CAN) 104. Therefore, a detection value and the like of a sensor (including a switch) connected to a particular ECU are also transmitted to other ECUs.

The driving assistance ECU 10 is a central control apparatus that performs traveling control of driving assistance such as collision prevention control, following inter-vehicular distance control, and lane keeping control. In the embodiment, as described in detail later, the driving assistance ECU 10 executes the collision prevention control for the vehicle 102 by collaborating with other ECUs. The following inter-vehicular distance control (adaptive cruise control) is abbreviated as ACC.

A camera sensor 12, a radar sensor 14, a sonar apparatus 16, and a setting operator 18 are connected to the driving assistance ECU 10. Each of the camera sensor 12 and the radar sensor 14 includes a plurality of camera apparatuses and a plurality of radar apparatuses, and the sonar apparatus 16 includes a plurality of sonars. The camera sensor 12, the radar sensor 14, and the sonar apparatus 16 function as an object target information acquisition apparatus 17 that acquires object target information of the periphery of the vehicle 102.

Each camera apparatus of the camera sensor 12 is not shown in the drawings but includes a camera unit that photographs the periphery of the vehicle 102, and a recognition unit that recognizes object targets such as other vehicles and a white line of a road by analyzing image data photographed and obtained by the camera unit. The recognition unit supplies information relating to the recognized object target to the driving assistance ECU 10 every predetermined amount of time.

Each radar apparatus of the radar sensor 14 includes a radar transmission-reception unit and a signal processing unit (not shown). The radar transmission-reception unit emits millimeter-wave-band radio waves (hereinafter referred to as "millimeter waves") and receives millimeter waves (in other words, reflected waves) reflected by a three-dimensional object (for example, another vehicle, a bicycle, and the like) existing within an emission range. The signal processing unit supplies information indicating the distance between the own vehicle and the three-dimensional object, the relative speed of the own vehicle and the three-dimensional object, the relative position (direction) of the three-dimensional object with respect to the own vehicle, and the like to the driving assistance ECU 10 every predetermined amount of time on the basis of a phase difference between the transmitted millimeter waves and the received reflected waves, an attenuation level of the reflected waves, the amount of time it takes to receive the reflected waves from when the millimeter waves are transmitted, and the like. A light detection and ranging (LiDAR) may be used in place of the radar sensor 14 or in addition to the radar sensor 14.

The sonar apparatus 16 includes a plurality of sonars, and those sonars are provided in a plurality of positions in an outer peripheral portion of the vehicle 102, for example, a left front end, a right front end, a left rear end, and a right rear end. Each sonar is configured to transmit ultrasound waves in a direction separating from the vehicle 102, receive ultrasound waves transmitted by the own sonar and reflected by an object, in other words, direct waves, and receive ultrasound waves transmitted by another sonar and reflected by the object, in other words, indirect waves. Each sonar is configured to output a signal indicating a peak value of received voltage corresponding to the received ultrasound waves and hence a signal indicating a peak value of the received ultrasound waves to the control apparatus of the sonar apparatus 16.

When the peak value is equal to or more than a reference value, the control apparatus of the sonar apparatus 16 determines that a corresponding sonar is currently receiving the ultrasound waves. The control apparatus of the sonar apparatus 16 estimates the distance between the vehicle 102 and the object that has reflected the direct waves and the indirect waves and the direction of the object with respect to the vehicle on the basis of the time of flight of the direct waves and the indirect waves.

The setting operator 18 is provided in a position that can be operated by a driver such as a steering wheel that is not shown in FIG. 1 and is operated by the driver. Although not shown in FIG. 1, the setting operator 18 includes a driving assistance switch. As described in detail later, the driving assistance ECU 10 executes the collision prevention control when the driving assistance switch is on.

A drive apparatus 22 that accelerates the vehicle 102 by applying a drive force to drive wheels 24 is connected to the drive ECU 20. The drive ECU 20 controls the drive apparatus 22 such that a drive force generated by the drive apparatus 22 changes in accordance with a drive operation by the driver at normal times and controls, when a command signal is received from the driving assistance ECU 10, the drive apparatus 22 on the basis of the command signal.

A braking apparatus 32 that decelerates the vehicle 102 by braking by applying a braking force to wheels 34 is connected to the braking ECU 30. The braking ECU 30 performs autonomous braking by controlling the braking apparatus such that a braking force generated by the braking apparatus 32 changes in accordance with a braking operation by the driver at normal times and controls, when a command signal is received from the driving assistance ECU 10, the braking apparatus 32 on the basis of the command signal.

Therefore, the braking ECU 30 and the braking apparatus 32 function as an autonomous braking apparatus 36 by collaborating with each other. When a braking force is applied to the wheels by the collision prevention control and the like, a brake lamp not shown in FIG. 1 is lit up.

A touchscreen-type indicator 52 that displays the situation of the control by the driving assistance ECU 10 and the like and an alarm apparatus 54 that issues an alarm are connect to the meter ECU 50. The indicator 52 may be a multi-information display on which meters and various information, for example, are displayed or may be a display of a navigation apparatus 80 described later. As described later, the indicator 52 displays the situation of the collision prevention control when the indicator 52 receives a signal from the driving assistance ECU 10.

The alarm apparatus 54 is activated when it is determined that there is a risk of the vehicle 102 colliding with an obstacle, and issues an alarm serving as one of the collision prevention controls, in other words, issues an alarm indicating that there is a risk of the vehicle 102 colliding with an obstacle. The alarm apparatus 54 may be any of an alarm apparatus that issues a visual alarm such as an alarm lamp, an alarm apparatus that issues an auditory alarm such as an alarm buzzer, and an alarm apparatus that issues a sensory alarm such as vibration of a seat or may be any combination thereof.

A driving operation sensor 60 and a vehicle state sensor 70 are also connected to the CAN 104. Information (referred to as sensor information) detected by the driving operation sensor 60 and the vehicle state sensor 70 is transmitted to the CAN 104. The sensor information transmitted to the CAN 104 can be used, as appropriate, in each ECU. The sensor information is information of a sensor connected to a particular ECU and may be transmitted to the CAN 104 from the particular ECU.

The driving operation sensor 60 includes a drive operation amount sensor that detects an operation amount of an accelerator pedal, a braking operation amount sensor that detects a master cylinder pressure or a pedal force on a brake pedal, and a brake switch that detects whether there is an operation of the brake pedal. The driving operation sensor 60 includes a steering angle sensor that detects a steering angle, a steering torque sensor that detects a steering torque, and the like.

The vehicle state sensor 70 includes a vehicle speed sensor that detects a vehicle speed V of the vehicle 102, a front-rear acceleration speed sensor that detects an acceleration speed of the vehicle in the front-rear direction, a lateral acceleration speed sensor that detects an acceleration speed of the vehicle in the lateral direction, a yaw rate sensor that detects a yaw rate of the vehicle, and the like.

The navigation apparatus 80 is also connected to the CAN 104. The navigation apparatus 80 includes a GPS receiving machine that detects the position of the vehicle 102, a storage apparatus that store therein map information and road information, and a communication apparatus that acquires latest information on the map information and the road information from the outside. In particular, the road information may include information on the position in which there is a possibility that the vehicle temporarily stops such as an intersection, a T-junction, and a crosswalk. The navigation apparatus 80 does not necessarily need to be provided.

Figure 2:
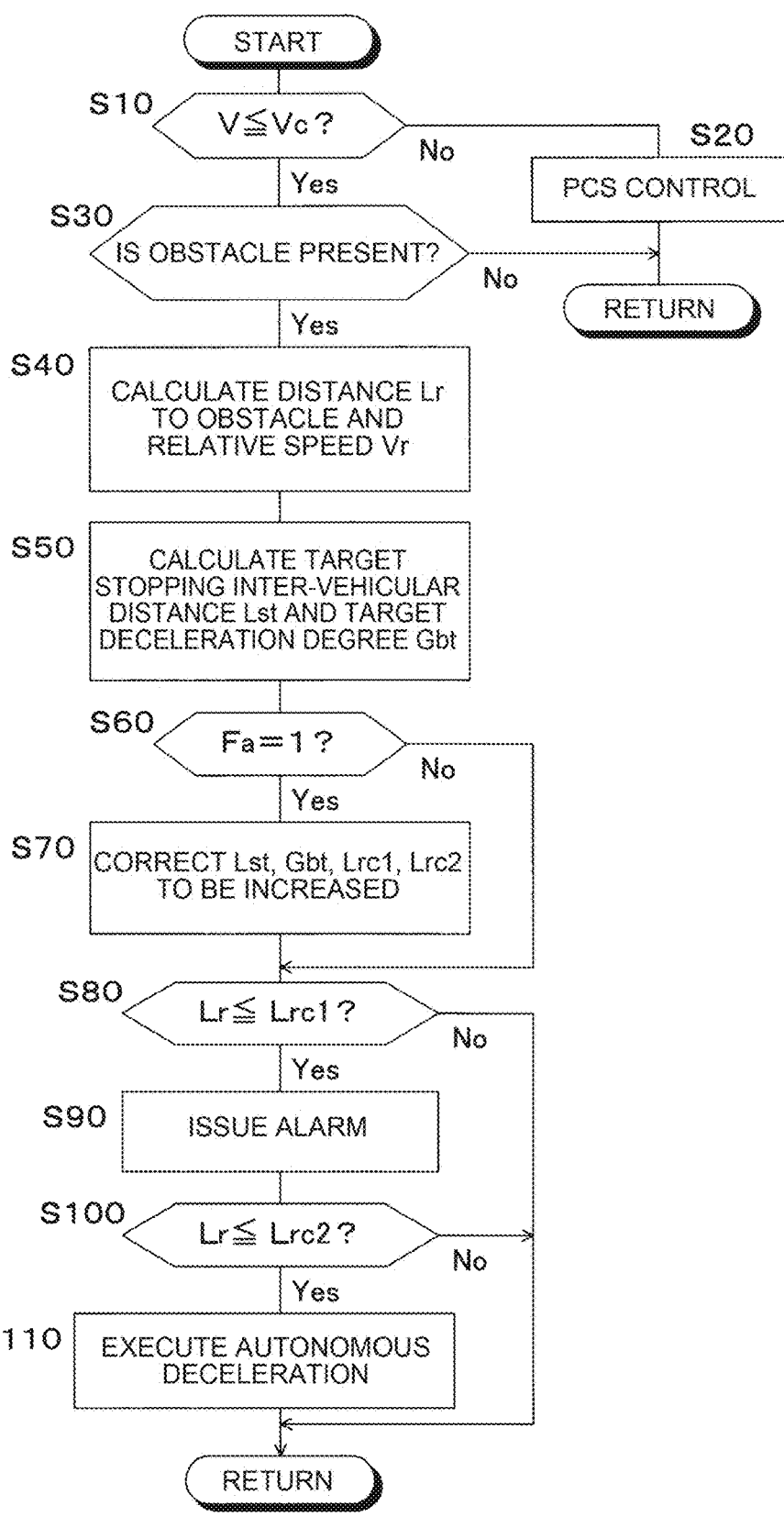
FIG. 2 is a flowchart corresponding to a collision prevention control program in the embodiment.

In the embodiment, the ROM of the driving assistance ECU 10 stores therein a collision prevention control program corresponding to a flowchart shown in FIG. 2. In the embodiment, the ROM of the driving assistance ECU 10 stores therein a flag control program corresponding to a flowchart shown in FIG. 3.

Collision Prevention Control (FIG. 2)

Next, the collision prevention control in the embodiment is described with reference to the flowchart shown in FIG. 2. The collision prevention control in accordance with the flowchart shown in FIG. 2 is repeatedly executed every predetermined amount of time by the CPU of the driving assistance ECU 10 in a situation in which the driving assistance switch is on.

First, in Step S10, the CPU determines whether the vehicle speed V of the vehicle 102 is equal to or less than a reference value Vc (positive constant) of the low-vehicle-speed determination. The present control proceeds to Step S30 when positive determination is performed, and the present control proceeds to Step S20 when negative determination is performed, in other words, the vehicle is traveling at an intermediate and high speed.

In Step S20, the CPU executes pre-crash safety control (hereinafter referred to as PCS control) by a way well-known in the present technical field. In the PCS control, a risk of the own vehicle colliding with the leading vehicle is determined on the basis of the distance between the own vehicle and the leading vehicle and the relative speed of the own vehicle with respect to the leading vehicle detected by the camera sensor 12 or the radar sensor 14, for example. When it is determined that there is a risk of a collision, the collision is prevented as a result of an alarm being issued by the alarm apparatus 54 and the own vehicle being decelerated by autonomous braking by the autonomous braking apparatus 36.

In Step S30, the CPU determines whether an obstacle is present ahead of the vehicle on the basis of information of an object target ahead of the vehicle 102 acquired by the sonar apparatus 16 or the radar sensor 14 of the object target information acquisition apparatus 17. The present control temporarily ends when negative determination is performed, and the present control proceeds to Step S40 when positive determination is performed.

In Step S40, the CPU calculates a distance Lr from the vehicle 102 to the obstacle and a relative speed Vr of the vehicle 102 with respect to the obstacle on the basis of the information of the object target ahead of the vehicle 102 acquired by the sonar apparatus 16 or the radar sensor 14.

In Step S50, the CPU calculates a target stopping inter-vehicular distance Lst such that the target stopping inter-vehicular distance Lst becomes greater as a ratio Lr/Vr of the distance Lr to the relative speed Vr becomes smaller, for example. The target stopping inter-vehicular distance Lst is a target value of a stopping inter-vehicular distance Ls where the distance Lr between the vehicle 102 and the obstacle when the vehicle 102 has stopped by autonomous deceleration is the stopping inter-vehicular distance Ls. The CPU calculates a target deceleration degree Gbt of the vehicle 102 for causing the stopping inter-vehicular distance Ls to be the target stopping inter-vehicular distance Lst on the basis of the current distance Lr, the target stopping inter-vehicular distance Lst, and the current vehicle speed V. The target deceleration degree Gbt is calculated so as to become greater as the relative speed Vr becomes higher and become greater as a difference Lr-Lst between the distance Lr and the target stopping inter-vehicular distance Lst becomes smaller.

In Step S60, the CPU determines whether a flag Fa controlled in accordance with a routine shown in FIG. 3 described later is 1, in other words, it is determined that the leading vehicle that has been temporarily stopped has started moving. The present control proceeds to Step S80 when negative determination is performed, and the present control proceeds to Step S70 when positive determination is performed.

In Step S70, the CPU corrects the target deceleration degree Gbt to be increased by correcting the target stopping inter-vehicular distance Lst to be increased. The CPU corrects first and second reference distances Lrc1 and Lrc2 respectively used in the determination in Step S80 and the determination in Step S100 described later to be increased. The first reference distance Lrc1 is greater than the second reference distance Lrc2. Therefore, conditions for determination of the risk in Steps S80 and S100 are changed such that it is more easily determined that there is a risk of the own vehicle colliding with an obstacle.

The increase correction may be performed by performing multiplication by a correction coefficient greater than 1 or may be performed by adding corresponding correction amounts (positive constants). The increase correction of the target deceleration degree Gbt may be performed without correcting the target stopping inter-vehicular distance Lst to be increased. A notification indicating that the issuing of an alarm and the autonomous deceleration are started earlier may be given by outputting a command signal to the meter ECU 50 and activating the indicator 52.

In Step S80, the CPU determines whether the distance Lr from the vehicle 102 to the obstacle is equal to or less than the first reference distance Lrc1, in other words, there is a risk of the vehicle 102 colliding with the obstacle. The present control temporarily ends when negative determination is performed, and the present control proceeds to Step S90 when positive determination is performed.

In Step S90, the CPU issues an alarm indicating that there is a risk of the vehicle 102 colliding with an obstacle by outputting a command signal to the meter ECU 50 and activating the alarm apparatus 54. The CPU gives a notification indicating that there is a risk of the vehicle 102 colliding with an obstacle by outputting a command signal to the meter ECU 50 and activating the indicator 52.

In Step S100, the CPU determines whether the distance Lr from the vehicle 102 to the obstacle is equal to or less than the second reference distance Lrc2. The present control temporarily ends when negative determination is performed, and the present control proceeds to Step S110 when positive determination is performed.

In Step S110, the CPU executes autonomous deceleration such that the deceleration degree of the vehicle becomes the target deceleration degree Gbt by activating the autonomous braking apparatus 36 and applying a braking force to the vehicle 102 and by reducing the drive force of the drive apparatus 22 by outputting command signals to the drive ECU 20 and the braking ECU 30.

As can be understood from the description above, in the embodiment, countermeasure control of reducing the risk of the vehicle colliding with an obstacle is autonomous deceleration performed by issuing an alarm by activating the alarm apparatus 54, reducing the drive force of the drive apparatus 22, and applying the braking force of the autonomous braking apparatus 36. However, any of the countermeasure control may be omitted.

Figure 3:
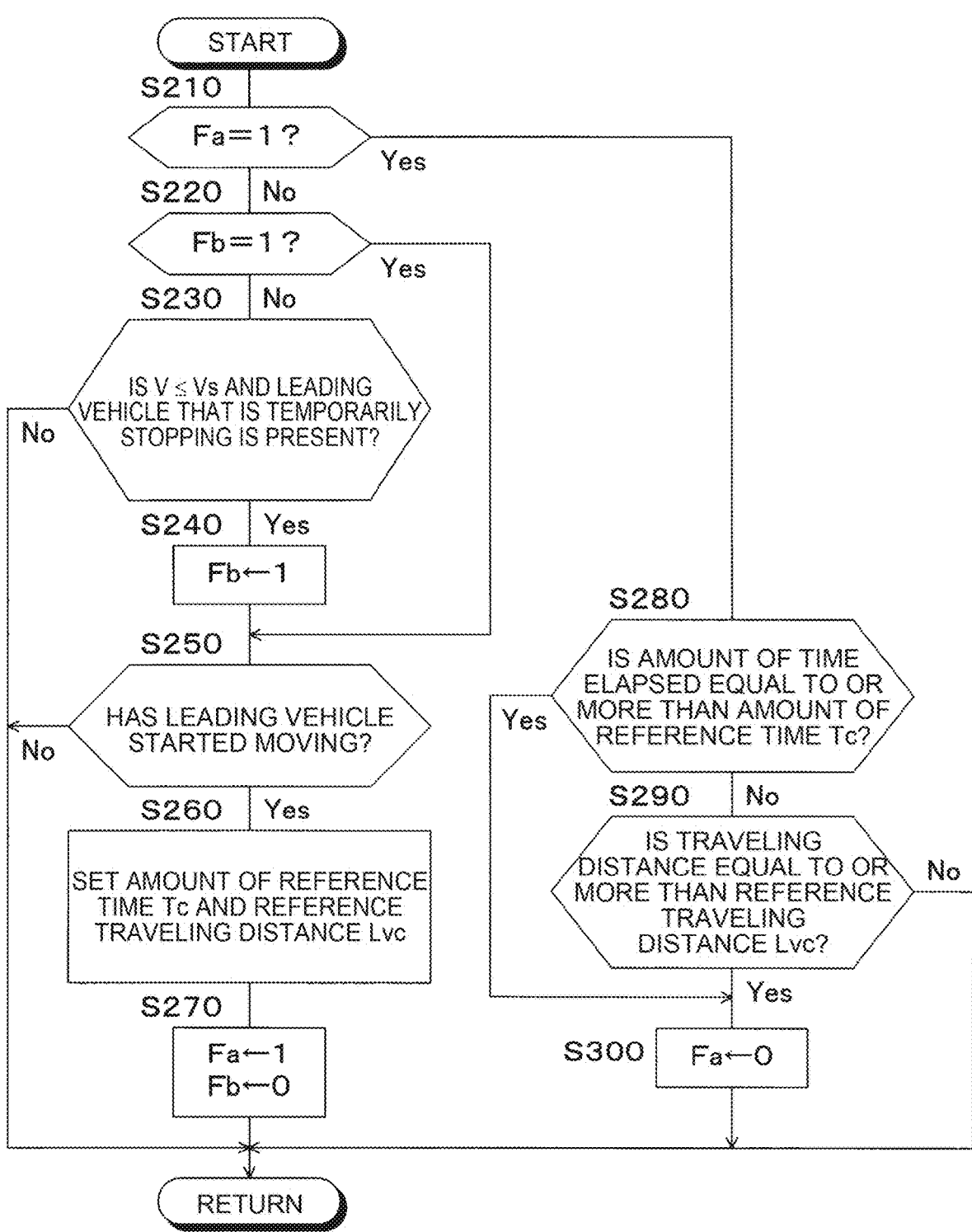
FIG. 3 is a flowchart corresponding to a flag control program in the embodiment.

Flag Control (FIG. 3)

Next, flag control in the embodiment is described with reference to the flowchart shown in FIG. 3. The flag control in accordance with the flowchart shown in FIG. 3 is repeatedly executed every predetermined amount of time by the CPU of the driving assistance ECU 10 when the driving assistance switch is on. Flags Fa and Fb are reset to 0 at the time of start of the flag control.

First, in Step S210, the CPU determines whether the flag Fa is 1, in other words, it is determined whether the leading vehicle that has been temporarily stopped has started moving. The present control proceeds to Step S280 when positive determination is performed, and the present control proceeds to Step S220 when negative determination is performed.

In Step S220, the CPU determines whether a flag Fb is 1, in other words, whether it is already determined that a leading vehicle is present that is temporarily stopped ahead of the own vehicle in Step S230 described later. The present control proceeds to Step S250 when positive determination is performed, and the present control proceeds to Step S230 when negative determination is performed.

In Step S230, the CPU determines whether the vehicle speed V of the own vehicle is equal to or less than the vehicle speed reference value Vs and a leading vehicle is present that is temporarily stopped ahead of the own vehicle on the basis of information acquired by the object target information acquisition apparatus 17 and the like. The present control temporarily ends when negative determination is performed, and the flag Fb is set to 1 in Step S240 and the present control then proceeds to Step S250 when the positive determination is performed.

The vehicle speed reference value Vs is a reference value for determining an extremely low vehicle speed and is a positive constant smaller than the reference value Vc of the low-vehicle-speed determination used in the determination in Step S10. The determination in Step S230 may be determination on whether the own vehicle is temporarily stopped and a leading vehicle is present that is temporarily stopped ahead of the own vehicle.

In Step S250, the CPU determines whether the leading vehicle that has been temporarily stopped has started moving. The present control temporarily ends when negative determination is performed, and the present control proceeds to Step S260 when positive determination is performed.

In Step S260, the CPU variably sets an amount of reference time Tc and a reference traveling distance Lvc used in the determination of Step S280 and the determination of Step S290 described later, respectively, in accordance with at least one of the type of the road ahead of the positions in which the own vehicle and the leading vehicle are temporarily stopped and the congestion degree of the vehicles.

When the road ahead is a crossroads or a T-junction, the amount of reference time Tc and the reference traveling distance Lvc may be set to be greater as the road intersecting with the road on which the own vehicle is traveling has a greater width and a larger number of lanes. When the road ahead is a road having a crosswalk or a stop line, the amount of reference time Tc and the reference traveling distance Lvc may be set to values smaller than in a case in which the road ahead has a crossroads or a T-junction. The amount of reference time Tc and the reference traveling distance Lvc may be set to be greater as the congestion degree of the vehicles ahead of the own vehicle becomes higher.

In Step S270, the CPU sets the flag Fa to 1 and resets the flag Fb to 0.

In Step S280, the CPU determines whether the amount of time elapsed from a time point at which it is determined that there is a risk of the vehicle 102 colliding with an obstacle in Step S80 is equal to or more than the amount of reference time Tc. The present control proceeds to Step S300 when positive determination is performed, and the present control proceeds to Step S290 when negative determination is performed. The amount of time elapsed may be the amount of time elapsed from a time point at which it is determined that there is a risk of the vehicle 102 colliding with an obstacle in Step S100.

In Step S290, the CPU determines whether a traveling distance of the vehicle from the time point at which it is determined that there is a risk of the vehicle 102 colliding with an obstacle in Step S80 is equal to or more than the reference traveling distance Lvc. The present control temporarily ends when negative determination is performed. When the positive determination is performed, the flag Fa is reset to 0 in Step S300 and the present control then temporarily ends. The traveling distance may be the traveling distance from a time point at which it is determined that there is a risk of the vehicle 102 colliding with an obstacle in Step S100.

Figure 4:
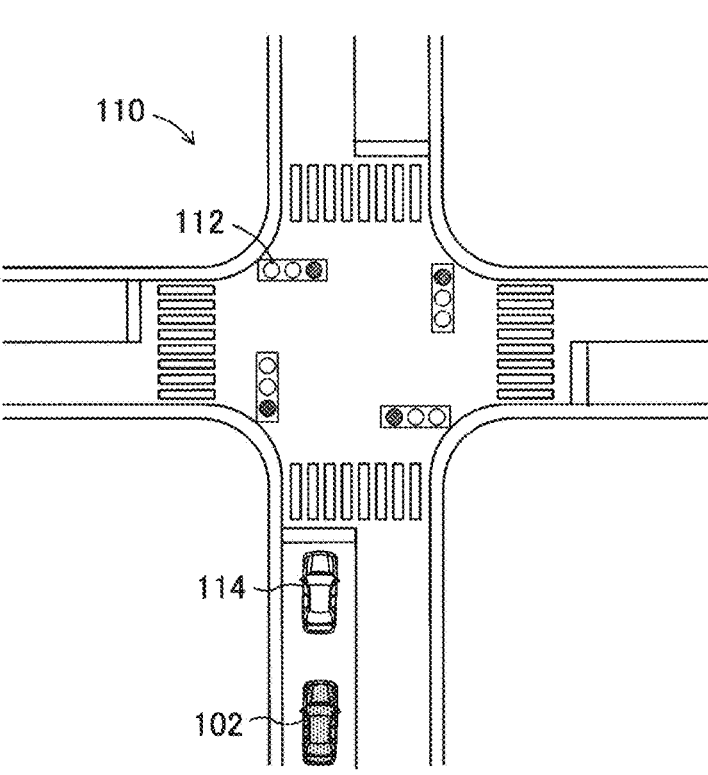
FIG. 4 is a view showing a situation in which a traffic light at a crossroads is red, a leading vehicle is stopped, and the own vehicle is stopped behind the leading vehicle.

Activation and Effects of Embodiment
When Leading Vehicle and Own Vehicle are Stopped (FIG. 4)

For example, FIG. 4 is a view showing a situation in which a traffic light 112 at a crossroads 110 is red, a leading vehicle 114 is stopped, and the own vehicle 102 is stopped behind the leading vehicle. In the case of the situation shown in FIG. 4, negative determination is performed in Steps S210 and S220 and positive determination is performed in Step S230, and hence the flag Fb is set to 1 in Step S240. Negative determination is performed in Step S250, and hence Steps S260 and S270 are not executed.

Therefore, the flag Fa is still 0. Thus, negative determination is performed in Step S60, and Step S70 is not executed. Therefore, the first and second reference distances Lrc1 and Lrc2 are not corrected to be increased, and the target deceleration degree Gbt is not corrected to be increased either. The determination in Steps S80 and $100 is performed by maintaining each of the first and second reference distances Lrc1 and Lrc2 at a standard value.

Figure 5:
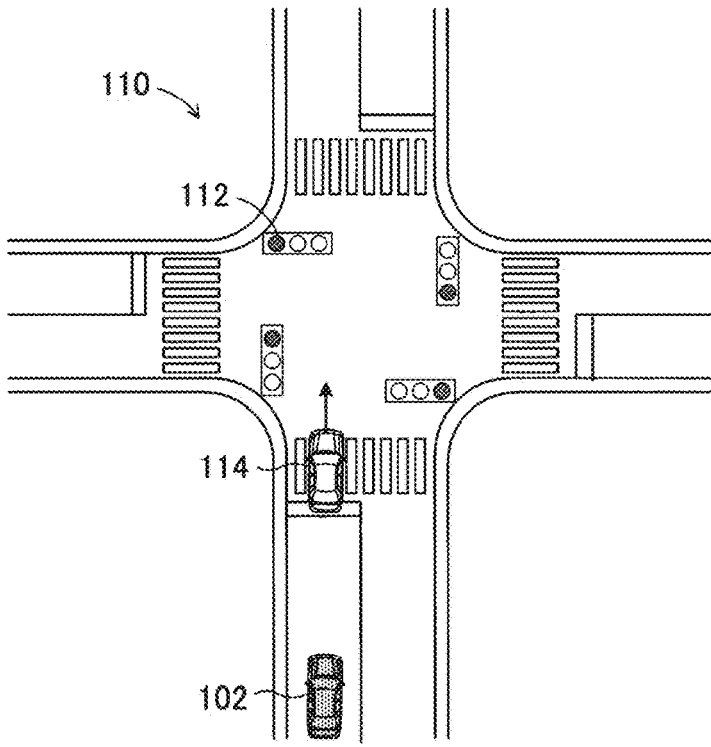
FIG. 5 is a view showing a situation in which the traffic light at the crossroads has turned green, the leading vehicle has started moving, and the own vehicle is stopped.

When Leading Vehicle Starts Moving (FIG. 5)
FIG. 5 shows a situation in which the traffic light 112 of the crossroads 110 turns green, the leading vehicle 114 has started moving, and the own vehicle 102 is stopped. In the case of the situation shown in FIG. 5, as with the case of the situation shown in FIG. 4, negative determination first is performed in Steps S210 and S220 and positive determination is performed in Step S230, and hence the flag Fb is set to 1 in Step S240. When positive determination is performed in Step S250, the amount of reference time Tc and the reference traveling distance Lvc are set in accordance with the type of the road ahead in Step S260, the flag Fa is set to 1 in Step S270, and the flag Fb is reset to 0.

Therefore, positive determination is performed in Step S60, and Step S70 is executed. As a result, the first and second reference distances Lrc1 and Lrc2 are corrected to be increased. In other words, conditions for determination of the risk in Steps S80 and S100 are changed such that it is more easily determined that there is a risk of the own vehicle colliding with an obstacle. As a result, the determination in Step S80 and the determination in Step S100 are respectively performed using the first and second reference distances Lrc1 and Lrc2 that have been corrected to be increased, and hence positive determination is performed earlier as compared to the case in which the first and second reference distances are standard values.

Figure 6:
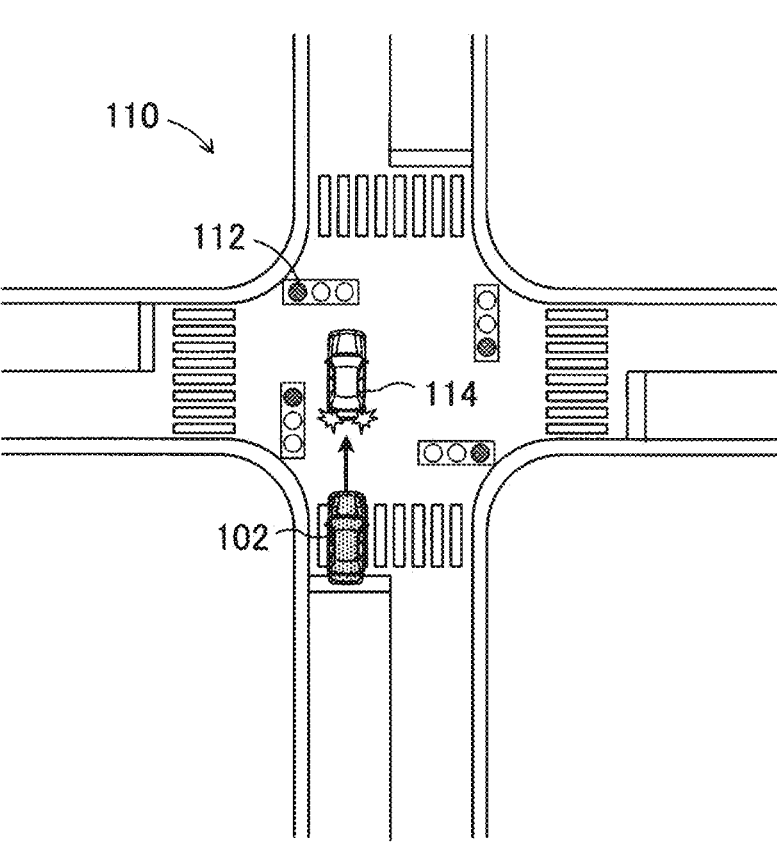

When Leading Vehicle Rapidly Decelerates or Stops Immediately after Starting to Move (FIG. 6)
FIG. 6 is a view showing a situation in which the leading vehicle 114 has started moving and the own vehicle 102 has started moving immediately thereafter, but the leading vehicle 114 has rapidly decelerated or stopped immediately after starting to move due to a traffic jam of vehicles ahead of the leading vehicle and the like. In a situation as shown in FIG. 6, the distance between the own vehicle 102 and the leading vehicle 114 rapidly decreases, and hence a risk of the own vehicle colliding with the back of the leading vehicle becomes higher.

However, according to the embodiment, as described above, the determination in Steps S80 and S100 becomes a positive determination earlier as compared to a case in which the first and second reference distances are standard values, and hence the issuing of an alarm in Step S90 and autonomous deceleration in Step S110 are started earlier.

Therefore, the risk of the own vehicle colliding with the back of the leading vehicle can be effectively reduced as compared to a related-art case in which the first and second reference distances Lrc1 and Lrc2 are not corrected to be increased.

According to the embodiment, not only are the first and second reference distances Lrc1 and Lrc2 corrected to be increased but the target deceleration degree Gbt is also corrected to be increased, and hence the own vehicle can be decelerated at a high deceleration degree. Therefore, the risk of the own vehicle colliding with the back of the leading vehicle can be effectively reduced as compared to a related-art case in which the target deceleration degree Gbt is not corrected to be increased.

According to the embodiment, when the amount of time elapsed from the time point at which it is determined that there is a risk of the vehicle 102 colliding with an obstacle is equal to or more than the amount of reference time Tc (S280), the execution of the countermeasure control (S80 and S100) for reducing the risk of the vehicle colliding with a leading vehicle as an obstacle ends (S300). Therefore, a risk of the countermeasure control being executed for an excessively long amount of time can be reduced.

According to the embodiment, when the traveling distance of the vehicle from the time point at which it is determined that there is a risk of the vehicle 102 colliding with an obstacle is equal to or more than the reference traveling distance Lvc (S290), the execution of the countermeasure control for reducing the risk of the vehicle colliding with a leading vehicle as an obstacle ends (S300). Therefore, the risk of the countermeasure control being executed for an excessively long amount of time can also be reduced by the above.

According to the embodiment, in Step S260, the amount of reference time Tc and the reference traveling distance Lvc are variably set in accordance with at least one of the type of the road ahead of the positions in which the vehicle and the leading vehicle have been temporarily stopped and the congestion degree of the vehicles. Therefore, the risk of the countermeasure control being executed for an excessively long amount of time and the risk of the amount of time for which the countermeasure control is executed being insufficient can be reduced as compared to a case in which the amount of reference time Tc and the reference traveling distance Lvc are constant. Step S260 may be omitted. In other words, the amount of reference time Tc and the reference traveling distance Lvc may be constant.

The present disclosure has been described in detail for a particular embodiment above, but the present disclosure is not limited to the embodiment described above, and it would be obvious to a person skilled in the art that other various embodiments are possible within the scope of the present disclosure.

For example, in the embodiment described above, the target deceleration degree Gbt and the first and second reference distances Lrc1 and Lrc2 are corrected to be increased in Step S70. However, it is also possible to perform the increase correction only for the target deceleration degree Gbt or only for the first and second reference distances Lrc1 and Lrc2.

In the embodiment described above, it is determined whether the amount of time elapsed is equal to or more than the amount of reference time Tc in Step S280, and it is determined whether the traveling distance of the vehicle is equal to or more than the reference traveling distance Lvc in Step S290. However, Step S280 or S290 may be omitted. In this case, the setting (Step S260) of the amount of reference time Tc or the reference traveling distance Lvc corresponding to the omitted determination is omitted.

In the embodiment described above, the effect of the alarm that is one of the countermeasure control is not caused to be higher even when the flag Fa is 1. However, when the flag Fa is 1, the appealing effect of the alarm may be caused to be higher. For example, when the alarm is issued by an intermittent sound of a buzzer, the buzzer may be changed from the intermittent sound to a continuous sound.

In the embodiment described above, the issuing of an alarm and autonomous deceleration control of the vehicle are executed as the countermeasure control. However, the countermeasure control may be the issuing of an alarm or the autonomous deceleration control of the vehicle. In that case, the effect of the countermeasure control may be set to be higher as compared to the case in which the countermeasure control is the issuing of an alarm and the autonomous deceleration control of the vehicle.

What is claimed is:

1. A collision prevention apparatus, comprising:
   a first sensor configured to detect a distance between a leading vehicle in front of an own vehicle and the own vehicle; and
   a processor configured to:
   based on the detected distance, calculate a relative speed of the own vehicle with respect to the leading vehicle;
   determine whether there is a possibility of the own vehicle colliding with the leading vehicle based on the detected distance and the calculated relative speed;
   determine whether the leading vehicle that has been temporarily stopped has started moving;
   based on determining that the leading vehicle has started moving, increase a target value of an inter-vehicular distance between the own vehicle and the leading vehicle from a standard distance preset for an autonomous deceleration, or increase a target deceleration degree from a standard deceleration degree preset for the autonomous deceleration; and
   based on determining that there is the possibility of the own vehicle colliding with the leading vehicle, perform the autonomous deceleration.

2. The collision prevention apparatus according to claim 1, wherein the processor is configured to, based on determining that the leading vehicle has started moving, increase the target value of the inter-vehicular distance.

3. The collision prevention apparatus according to claim 2, wherein the processor is configured to increase the target value of the inter-vehicular distance as a ratio of the detected distance between the leading vehicle and the own vehicle to the calculated relative speed becomes smaller.

4. The collision prevention apparatus according to claim 1, wherein the processor is configured to, based on determining that the leading vehicle has started moving, increase the target deceleration degree for the autonomous deceleration.

5. The collision prevention apparatus according to claim 4, wherein the processor is configured to increase the target deceleration degree for the autonomous deceleration as the calculated relative speed becomes higher.

6. The collision prevention apparatus according to claim 4, wherein the processor is configured to increase the target deceleration degree for the autonomous deceleration as a difference between (i) the detected distance and (ii) the target value of the inter-vehicular distance, becomes smaller.

7. The collision prevention apparatus according to claim 1, wherein
the processor is configured to:
    based on determining that the leading vehicle has started moving, increase a first threshold value from a first base value, the first threshold value being used to determine whether to initiate the autonomous deceleration of the own vehicle, and determine whether the detected distance is equal to or smaller than the first threshold value; and
    based on determining that the detected distance is equal to or smaller than the first threshold value, perform the autonomous deceleration of the own vehicle.

8. The collision prevention apparatus according to claim 7, wherein
the processor is configured to:
    based on determining that the leading vehicle has started moving, increase a second threshold value that is greater than the first threshold value from a second base value, the second threshold value being used to determine whether to issue an alarm, and determine whether the detected distance is equal to or smaller than the second threshold value; and
    based on determining that the detected distance is equal to or smaller than the second threshold value, issue the alarm by at least one of an alarm lamp, a buzzer, or a vibration of a seat of the own vehicle.

9. The collision prevention apparatus according to claim 7, wherein the processor is configured to change the target value to the standard distance and change the target deceleration degree to the standard deceleration degree when an amount of time elapsed from a time point at which it is determined that the detected distance is equal to or smaller than the first threshold value is equal to or greater than a third threshold value.

10. The collision prevention apparatus according to claim 9, wherein the processor is configured to set the third threshold value such that the third threshold value is greater as a road intersecting with a road on which the own vehicle is traveling has a greater width and a larger number of lanes than the road on which the own vehicle is traveling.

11. The collision prevention apparatus according to claim 9, wherein the processor is configured to set the third threshold value such that the third threshold value is smaller in a case where a road ahead of the own vehicle has a crosswalk or a stop line, compared to a case in which the road ahead of the own vehicle has a crossroads or a T-junction.

12. The collision prevention apparatus according to claim 9, wherein the processor is configured to set the third threshold value such that the third threshold value is greater as a congestion degree of vehicles ahead of the own vehicle becomes higher.

13. The collision prevention apparatus according to claim 7, wherein the processor is configured to change the target value to the standard distance and change the target deceleration degree to the standard deceleration degree when a traveling distance of the own vehicle from a time point at which it is determined that the detected distance is equal to or smaller than the first threshold value is equal to or greater than a fourth threshold value.

14. The collision prevention apparatus according to claim 13, wherein the processor is configured to set the fourth threshold value such that the fourth threshold value is greater as a road intersecting with a road on which the own vehicle is traveling has a greater width and a larger number of lanes than the road on which the own vehicle is traveling.

15. The collision prevention apparatus according to claim 13, wherein the processor is configured to set the fourth threshold value such that the fourth threshold value is smaller in a case where a road ahead of the own vehicle has a crosswalk or a stop line, compared to a case in which the road ahead of the own vehicle has a crossroads or a T-junction.

16. The collision prevention apparatus according to claim 13, wherein the processor is configured to set the fourth threshold value such that the fourth threshold value is greater as a congestion degree of vehicles ahead of the own vehicle becomes higher.

17. The collision prevention apparatus according to claim 1, further comprising a vehicle state sensor including a vehicle speed sensor that detects a vehicle speed of the own vehicle,
    wherein the processor is configured to:
        based on the detected distance of the first sensor, determine whether there is the leading vehicle that has been temporarily stopped;
        determine whether the detected vehicle speed is smaller than a fifth threshold value; and
        based on determining that the detected vehicle speed is smaller than the fifth threshold value, and that there is the leading vehicle that has been temporarily stopped, determine whether the leading vehicle that has been temporarily stopped has started moving.

18. The collision prevention apparatus according to claim 17, wherein the processor is configured to:
    based on determining that the leading vehicle has started moving, increase the target value of the inter-vehicular distance;
    increase the target value of the inter-vehicular distance as a ratio of the detected distance to the calculated relative speed becomes smaller;
    based on determining that the leading vehicle has started moving, increase the target deceleration degree for the autonomous deceleration;
    increase the target deceleration degree for the autonomous deceleration as the calculated relative speed becomes higher;
    increase the target deceleration degree for the autonomous deceleration so as to become greater as a difference between (i) the detected distance and (ii) the target value of the inter-vehicular distance becomes smaller;
    based on determining that the leading vehicle has started moving, increase a first threshold value;
    based on determining that the leading vehicle has started moving, determine whether the detected distance is equal to or smaller than the first threshold value;
    based on determining that the detected distance is equal to or smaller than the first threshold value, perform the autonomous deceleration of the own vehicle;
    based on determining that the leading vehicle has started moving, increase a second threshold value that is greater than the first threshold value;
    based on determining that the leading vehicle has started moving, determine whether the detected distance is equal to or smaller than the second threshold value;
    based on determining that the detected distance is equal to or smaller than the second threshold value, issue an alarm by at least one of an alarm lamp, a buzzer, or a vibration of a seat of the own vehicle;
    change the target value to the standard distance and change the target deceleration degree to the standard deceleration degree when an amount of time elapsed from a time point at which it is determined that the detected distance is equal to or smaller than the first threshold value is equal to or greater than a third threshold value;

set the third threshold value such that the third threshold value is greater as a road intersecting with a road on which the own vehicle is traveling has a greater width and a larger number of lanes than the road on which the own vehicle is traveling;

set the third threshold value such that the third threshold value is smaller in a case where a road ahead of the own vehicle has a crosswalk or a stop line, compared to a case in which the road ahead of the own vehicle has a crossroads or a T-junction;

set the third threshold value such that the third threshold value is greater as a congestion degree of vehicles ahead of the own vehicle becomes higher;

change the target value to the standard distance and change the target deceleration degree to the standard deceleration degree when a traveling distance of the own vehicle from the time point at which it is determined that the detected distance is equal to or smaller than the first threshold value is equal to or greater than a fourth threshold value;

set the fourth threshold value such that the fourth threshold value is greater as the road intersecting with the road on which the own vehicle is traveling has the greater width and the larger number of lanes than the road on which the own vehicle is traveling;

set the fourth threshold value such that the fourth threshold value is smaller in the case where the road ahead of the own vehicle has the crosswalk or the stop line, compared to the case in which the road ahead of the own vehicle has the crossroads or the T-junction; and set the fourth threshold value such that the fourth threshold value is greater as the congestion degree of vehicles ahead of the own vehicle becomes higher.

* * * * *